(12) United States Patent
Hershkowitz

(10) Patent No.: US 11,275,170 B2
(45) Date of Patent: Mar. 15, 2022

(54) USE OF DUAL PROCESSING CHANNELS FOR STATIONARY AND MOVING OBJECTS ILLUMINATED BY RADAR

(71) Applicant: Electromagnetic Systems, Inc., El Segundo, CA (US)

(72) Inventor: Stephen Jeffrey Hershkowitz, Manhattan Beach, CA (US)

(73) Assignee: Electromagnetic Systems, Inc., El Segundo, CA (US)

( * ) Notice: Subject to any disclaimer, the term of this patent is extended or adjusted under 35 U.S.C. 154(b) by 346 days.

(21) Appl. No.: 16/376,941

(22) Filed: Apr. 5, 2019

(65) Prior Publication Data

US 2019/0310360 A1     Oct. 10, 2019

Related U.S. Application Data

(60) Provisional application No. 62/653,558, filed on Apr. 6, 2018.

(51) Int. Cl.
| | | |
|---|---|---|
| *G01S 13/50* | (2006.01) |
| *G01S 7/03* | (2006.01) |
| *G01S 13/52* | (2006.01) |
| *G01S 13/89* | (2006.01) |
| *G01S 7/288* | (2006.01) |

(Continued)

(52) U.S. Cl.
CPC .............. *G01S 13/505* (2013.01); *G01S 7/03* (2013.01); *G01S 7/2883* (2021.05); *G01S 7/356* (2021.05); *G01S 13/52* (2013.01); *G01S 13/582* (2013.01); *G01S 13/72* (2013.01); *G01S 13/89* (2013.01)

(58) Field of Classification Search
CPC ........ G01S 13/505; G01S 13/72; G01S 13/52; G01S 13/582; G01S 13/89; G01S 7/03; G01S 7/2883; G01S 7/356
See application file for complete search history.

(56) References Cited

U.S. PATENT DOCUMENTS 9,229,102 B1 *   1/2016   Wright ................... G01S 13/887
2010/0253540 A1 * 10/2010   Seder ..................... G01S 13/867
                                                        340/905

(Continued)

FOREIGN PATENT DOCUMENTS

WO    WO-2018142395 A1 *  8/2018 ............ G05D 1/0272

*Primary Examiner* — Thomas M Hammond, III
(74) *Attorney, Agent, or Firm* — Alonzo & Associates; Arlyn Alonzo

(57) ABSTRACT

Aspects of the disclosure are directed to dual processing. Accordingly disclosed are, an apparatus and a method for dual processing for stationary objects and moving objects including generating a first set of range/Doppler images and a second set of range/Doppler images from a radar system, wherein the first set of range/Doppler images is processed over a first processing time and the second set of range/Doppler images is processed over a second processing time; using a first clustering algorithm to generate a first set of range/Doppler/angle object detections based on the first set of range/Doppler images; using a second clustering algorithm to generate a second set of range/Doppler/angle object detections based on the second set of range/Doppler images; and generating a set of range/Doppler/angle object tracks for stationary and moving objects from the first set of range/Doppler/angle object detections and the second set of range/Doppler/angle object detections.

18 Claims, 5 Drawing Sheets

(51) Int. Cl.
*G01S 7/35* (2006.01)
*G01S 13/72* (2006.01)
*G01S 13/58* (2006.01)

(56) References Cited

U.S. PATENT DOCUMENTS

| | | | |
|---|---|---|---|
| 2013/0113647 A1* | 5/2013 | Sentelle | G01S 13/887 342/22 |
| 2015/0198711 A1* | 7/2015 | Zeng | G01S 13/726 342/59 |
| 2016/0084941 A1* | 3/2016 | Arage | G01S 13/584 342/91 |
| 2016/0162742 A1* | 6/2016 | Rogan | G06K 9/6218 382/103 |
| 2017/0168156 A1* | 6/2017 | Hoare | G01S 13/87 |
| 2017/0363731 A1* | 12/2017 | Bordes | G01S 13/50 |
| 2019/0120955 A1* | 4/2019 | Zhong | G01S 13/584 |
| 2019/0128998 A1* | 5/2019 | Josefsberg | H03L 7/091 |

* cited by examiner

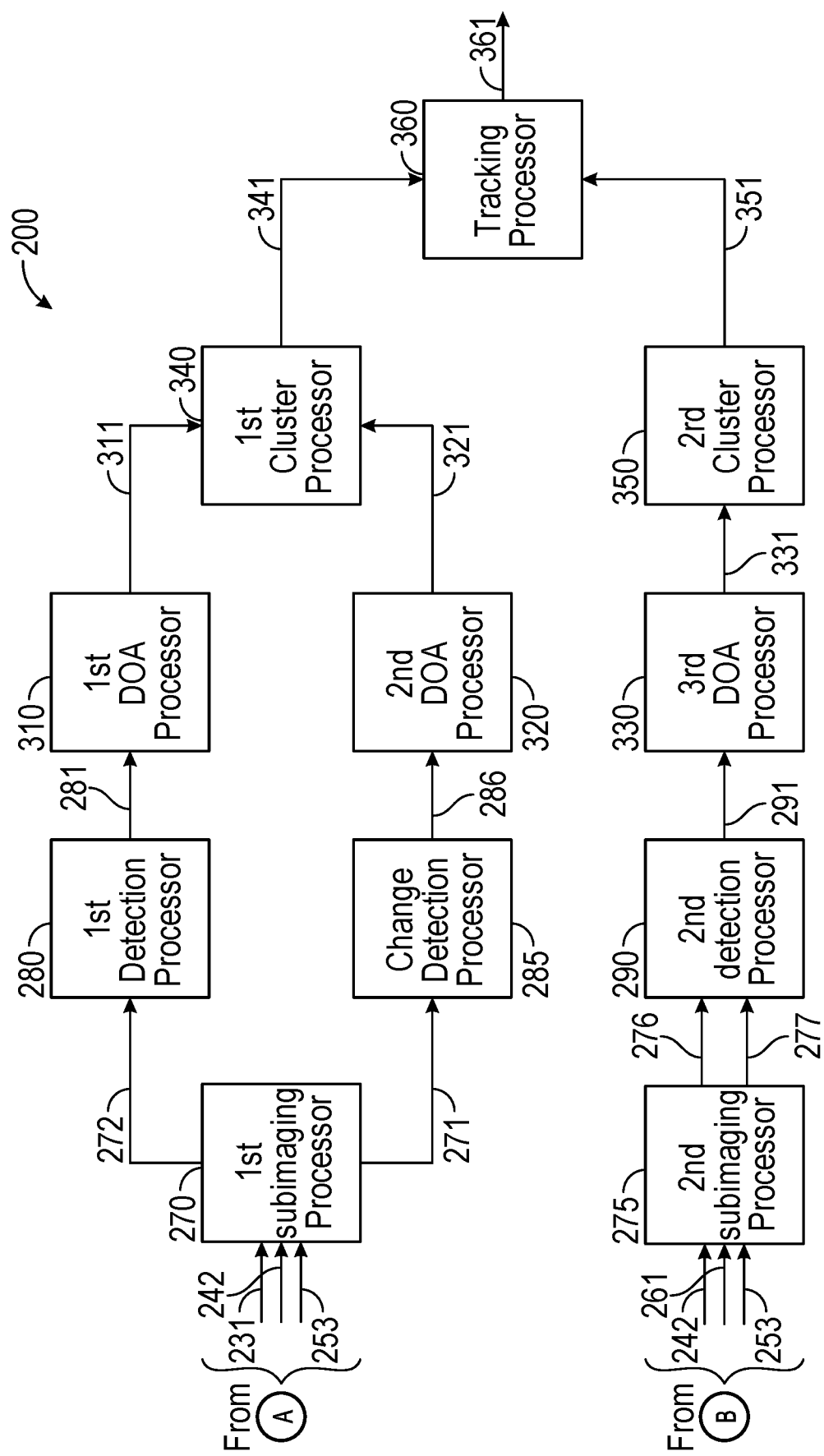
FIG. 2 (Continue)

USE OF DUAL PROCESSING CHANNELS FOR STATIONARY AND MOVING OBJECTS ILLUMINATED BY RADAR

CLAIM OF PRIORITY UNDER 35 U.S.C. § 119

The present Application for Patent claims priority to Provisional Application No. 62/653,558 entitled "USE OF DUAL PROCESSING CHANNELS FOR STATIONARY AND MOVING OBJECTS ILLUMINATED BY RADAR" filed Apr. 6, 2018 and assigned to the assignee hereof and hereby expressly incorporated by reference herein.

TECHNICAL FIELD

This disclosure relates generally to the field of dual processing, and, in particular, to dual radar processing for stationary and moving objects.

BACKGROUND

Radars, for example, automotive radars, may be used to process two generic types of objects, moving and stationary. For example, radars may be designed to perform two different tasks: the detection and tracking of moving objects and the mapping of stationary objects. However, the optimal processing time intervals and algorithms differ for the two tasks. The present disclosure relates to a radar with at least two processing channels. In one example, fused channels are multiple processing channels which are synergistically combined to yield results which are more complete or accurate than available from any single processing channel alone.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides dual processing. Accordingly, a method for implementing dual processing for stationary objects and moving objects, the method including generating a first set of range/Doppler images and a second set of range/Doppler images from a radar system, wherein the first set of range/Doppler images is processed over a first processing time and the second set of range/Doppler images is processed over a second processing time; using a first clustering algorithm to generate a first set of range/Doppler/angle object detections based on the first set of range/Doppler images; using a second clustering algorithm to generate a second set of range/Doppler/angle object detections based on the second set of range/Doppler images; and generating a set of range/Doppler/angle object tracks for stationary and moving objects from the first set of range/Doppler/angle object detections and the second set of range/Doppler/angle object detections.

In one example, the first processing time is optimized for the moving objects. In one example, the second processing time is optimized for the stationary objects. In one example, the first processing time is a fixed duration. In one example, the second processing time is a duration over which the radar system travels a fixed distance. In one example, the first clustering algorithm is a K-Means clustering algorithm or a morphological closing algorithm. In one example, the second clustering algorithm is a K-Means clustering algorithm or a morphological closing algorithm.

In one example, the first clustering algorithm clusters a first set of range/Doppler/angle scatterer detections from the first set of range/Doppler images formed over processing time intervals of a fixed duration, into the first set of range/Doppler/angle object detections. In one example, the second clustering algorithm clusters a second set of range/Doppler/angle scatterer detections from the second set of range/Doppler images formed over processing time intervals during which the radar system travels a fixed distance, into the second set of range/Doppler/angle object detections.

In one example, the method further includes generating a first set of range/Doppler scatterer detections to mitigate against the impact of receiver noise on the radar system. In one example, the method further includes generating the first set of range/Doppler/angle scatterer detections using the first set of range/Doppler scatterer detections. In one example, the method further includes generating a second set of range/Doppler scatterer detections to mitigate against the impact of receiver noise on the radar system. In one example, the method further includes generating the second set of range/Doppler/angle scatterer detections using the second set of range/Doppler scatterer detections.

Another aspect of the disclosure provides an apparatus for dual processing, the apparatus including a set of image formation processors to generate a first set of range/Doppler images and a second set of range/Doppler images from a radar system, wherein the first set of range/Doppler images is processed over a first processing time and the second set of range/Doppler images is processed over a second processing time; a first clustering algorithm device to generate a first set of range/Doppler/angle object detections based on the first set of range/Doppler images, wherein the first clustering algorithm device is coupled to the set of image formation processors; a second clustering algorithm device to generate a second set of range/Doppler/angle object detections based on the second set of range/Doppler images, wherein the second clustering algorithm device is coupled to the set of image formation processors; and a fused tracking processor, coupled to the first clustering algorithm device and the second clustering algorithm device, to generate a set of range/Doppler/angle object tracks for stationary and moving objects from the first set of range/Doppler/angle object detections and the second set of range/Doppler/angle object detections.

In one example, the first clustering algorithm device clusters a first set of range/Doppler/angle scatterer detections from the first set of range/Doppler images formed over processing time intervals of a fixed duration, into the first set of range/Doppler/angle object detections. In one example, the second clustering algorithm device clusters a second set of range/Doppler/angle scatterer detections from the second set of range/Doppler images formed over processing time intervals during which the radar system travels a fixed distance, into the second set of range/Doppler/angle object detections.

In one example, the apparatus, further includes a first detection processor to generate a first set of range/Doppler scatterer detections to mitigate against the impact of receiver noise on the radar system, and a second detection processor to generate a second set of range/Doppler scatterer detections to mitigate against the impact of receiver noise on the radar system. In one example, the apparatus further includes a first direction of arrival (DOA) processor to generate the first set of range/Doppler/angle scatterer detections using the first set of range/Doppler scatterer detections and a second direction of arrival (DOA) processor to generate the second set of range/Doppler/angle scatterer detections using the second set of range/Doppler scatterer detections.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
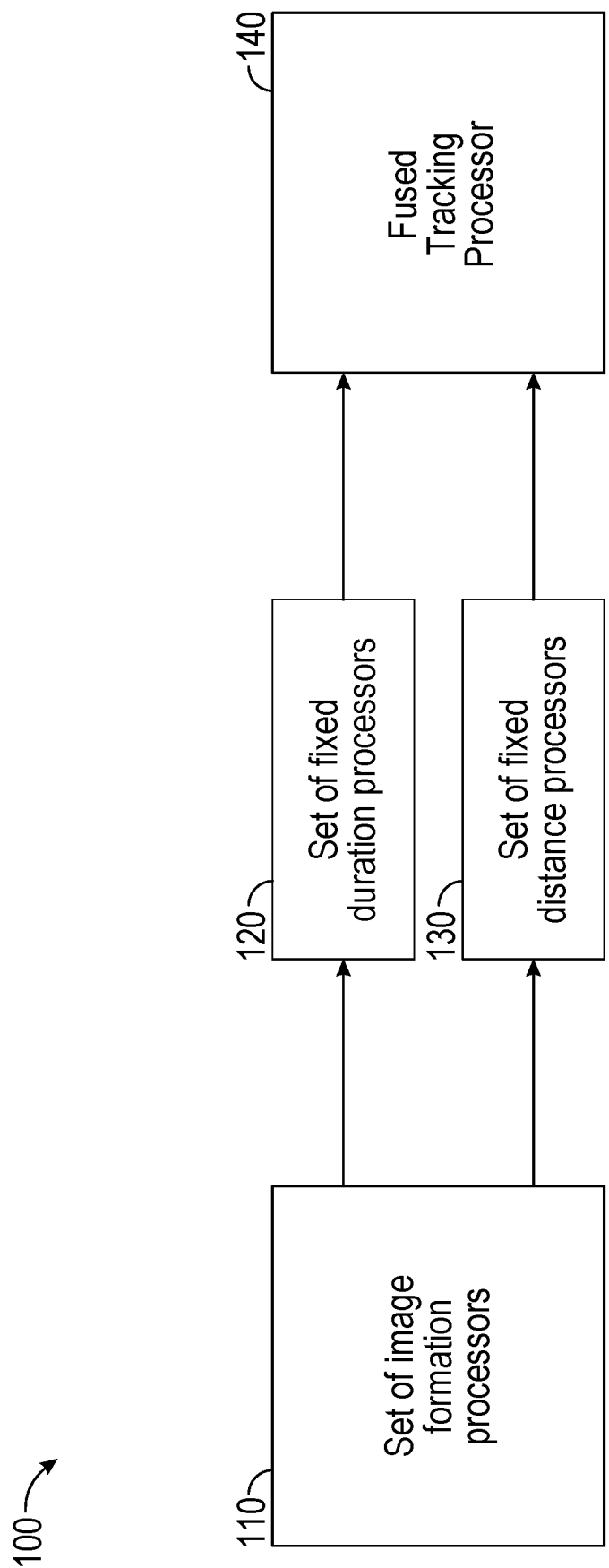
FIG. 1 illustrates an example block diagram of a radar system in accordance with the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one example, the present disclosure relates to a radar system (a.k.a., radar) with at least two processing channels. In one example, fused channels are multiple processing channels which are synergistically combined to yield results which are more complete or accurate than available from any single processing channel alone.

Radars, for example, automotive radars, may be used to gather information about both moving and stationary objects. That is, a radar may detect and track moving objects and map stationary objects. However, the optimal processing time intervals and algorithms may differ for moving objects and stationary objects. For example, processing time intervals for moving objects with the necessary update rates may result in suboptimal mapping of stationary objects. In one example, the present disclosure provides an algorithmic process using two or more processing channels in which the selection of a first processing time interval for moving objects is driven by the required update rate and the selection of a second processing time interval for stationary objects is driven by the desired mapping accuracy.

In one example, the first and second processing time intervals are processed differently in at least two processing channels, and the outputs from the processing channels may be fused to provide comprehensive measurements of the instantaneous positions and velocities of illuminated objects. In one example, fused channels are multiple processing channels which are synergistically combined to yield results which are more complete or accurate than available from any single processing channel alone.

In one example, the present disclosure provides an algorithmic process to detect and localize radar returns from stationary and moving objects separately illuminated by a radar, through digital signal processing. For example, radar returns are measurements made by a radar receiver from a radar waveform generated by a radar transmitter and reflected by stationary and moving objects. In one example, if these types of radar returns are not processed in separate processing channels, the update rate for moving objects and the angular measurement accuracy for stationary objects may be too low to meet application needs, e.g., autonomous driving.

By using processing time intervals of fixed duration for moving objects and processing time intervals during which the radar moves by a fixed distance for stationary objects, the present disclosure provides sufficiently high update rates and angular measurement accuracy. In one aspect, the present disclosure is applicable to radars with multiple channels, e.g., electronically scanned array automotive radars, Multiple Input Multiple Output (MIMO) automotive radars, and other variants of automotive radars possessing multiple channels for spatial diversity. In one example, the present disclosure is designed to function even when multiple objects are located in the same range bin. One skilled in the art would understand that although automotive radar applications are mentioned herein, other types of applications for processing radar returns from both stationary and moving objects may be within the spirit and scope of the present disclosure.

FIG. 1 illustrates an example block diagram of a radar system 100 in accordance with the present disclosure. Shown in FIG. 1 is a radar system (which includes processors) for processing stationary objects and moving objects. In one example, the radar system 100 includes a set of image formation processors 110 (e.g., processors coupled to memory units) for forming range/Doppler images over processing time intervals of fixed duration and for forming range/Doppler images over processing time intervals during which the radar travels a fixed distance. In one example, a single processor (e.g., a processor coupled to a memory unit) performs the range/Doppler image formation over a plurality of processing time intervals.

In one example, the radar system 100 includes a set of fixed duration processors 120 (e.g., processors coupled to memory units). In one example, the set of fixed duration processors 120 generates a first set of range/Doppler/angle object detections. In one example, the input to the set of fixed duration processors 120 is the range/Doppler images formed over processing time intervals of fixed duration from the set of image formation processors, 110. In one example, a single processor (e.g., a processor coupled to a memory unit) generates the first set of range/Doppler/angle object detections over processing time intervals of fixed duration.

In one example, the radar system 100 includes a set of fixed distance processors 130 (e.g., processors coupled to memory units). In one example, the set of fixed distance processors 130 generates a second set of range/Doppler/angle object detections In one example, the input to the set of fixed distance processors 130 is the range/Doppler images formed over processing time intervals during which the radar travels a fixed distance from the set of image formation processors, 110. In one example, a single processor (e.g., a processor coupled to a memory unit) generates the second set of range/Doppler/angle object detections over processing time intervals during which the radar travels a fixed distance.

In one example, the radar system 100 includes a fused tracking processor 140 (e.g., a processor coupled to a memory unit) for tracking the first set of range/Doppler/angle object detections in time from the outputs of the fixed duration processors 120 and the second set of range/Doppler/angle object detections in time from the outputs of the fixed distance processors 130.

Figure 2:
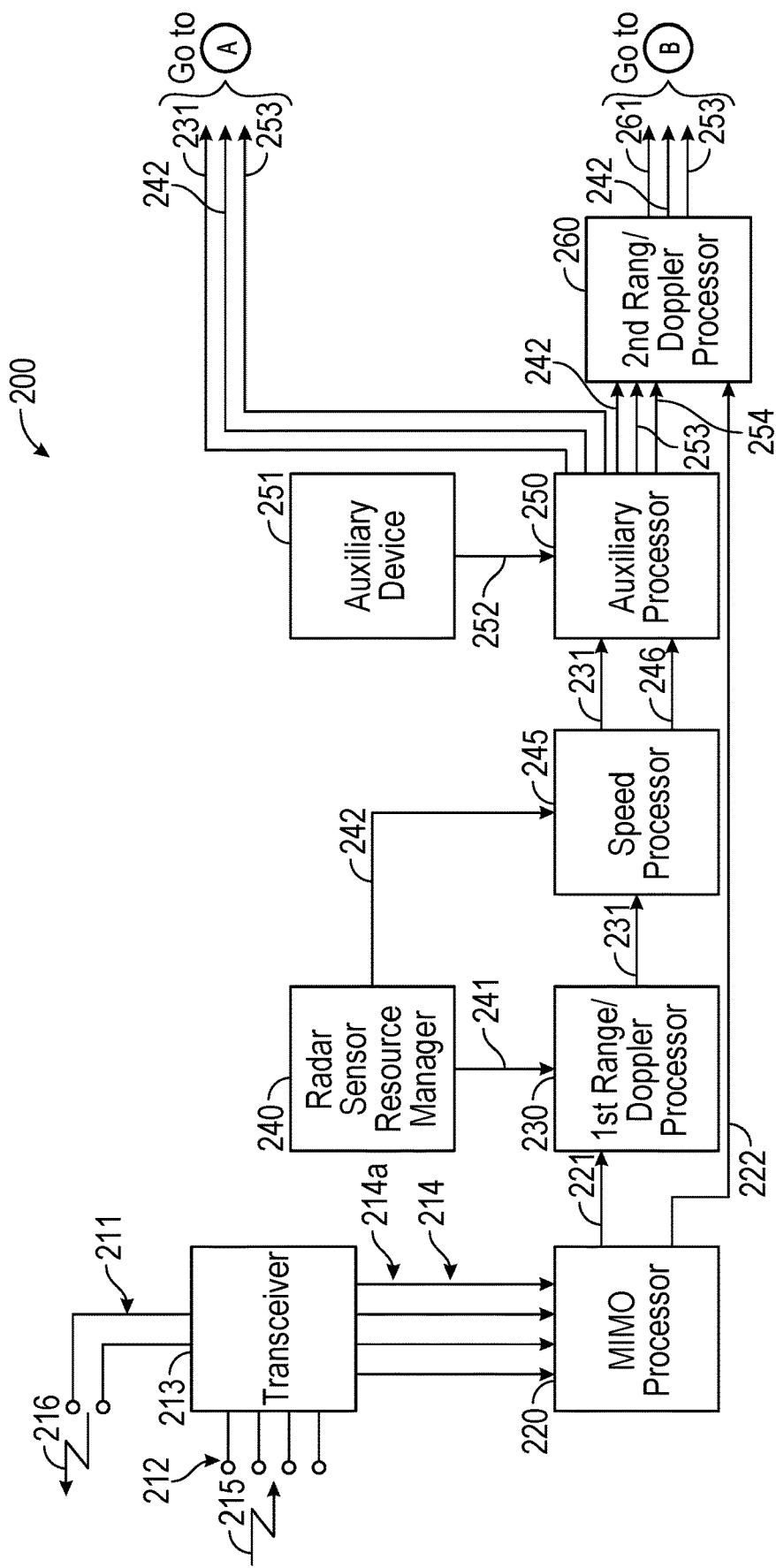
FIG. 2 illustrates an example radar system with dual processing channels for stationary and moving objects in accordance with the present disclosure.

FIG. 2 illustrates an example radar system 200 with dual processing channels for stationary and moving objects in accordance with the present disclosure. In FIG. 2, the flow of data and signal processing through the radar system 200 is shown via the arrows. For example, one or more transmit antenna elements 211 radiate a transmit waveform 216 towards a plurality of objects. In one example, multiple receive antenna elements 212 capture a reflected waveform 215 from the plurality of objects. In one example, a radar transceiver 213 is coupled to transmit antenna elements 211 and receive antenna elements 212. Although two transmit antenna elements and four receive antenna elements are shown, one skilled in the art would understand that the quantity of transmit or receive antenna elements shown is not limiting and that other quantities may be used within the scope and spirit of the present disclosure.

For example, the radar transceiver 213 generates the transmit waveform 216 radiated by the transmit antenna elements 211 and receives the reflected waveform 215 captured by the receive antenna elements 212. The radar transceiver 213 may convert the received reflected waveform 215 into a digitized receive data flow 214a for a plurality of receive channels 214. For example, each receive channel 214 may be mapped to one of the multiple receive antenna elements 212. In one example, the radar transceiver 213 may include digital to analog converters (DACs), upconverters, filters, amplifiers, passive components, low noise amplifiers, downconverters, analog to digital converters (ADCs), frequency synthesizers, oscillators, etc.

In one example, the digitized receive data flow 214a may be sent to a MIMO processor 220 (e.g., a processor coupled to a memory unit) for producing virtual receive channel digitized data 221 and 222. In the case of a multiple input multiple output (MIMO) radar, MIMO processor 220 may include MIMO processing required to produce virtual receive channel digitized data 221 and 222. For example, consider a MIMO radar with three transmit channels and four receive channels. MIMO processing contained in MIMO processor 220 may produce (i.e., represent) up to twelve virtual receive channels, for example. Accordingly, in one example, the output may produce (i.e., represent) up to twelve virtual channels rather than four real receive channels. In other examples, the number of virtual channels may be arbitrary or based on the number of transmit channels and the number of receive channels.

In one example, a first range/Doppler processor 230 (e.g., a processor coupled to a memory unit) accepts the virtual receive channel digitized data 221 for a first range/Doppler data transformation. In one example, the first range/Doppler processor 230 is configured into a radar mode by a radar sensor resource manager 240 which sends radar mode information 241 to configure the first range/Doppler processor 230. In one example the radar mode information 241 includes configuration information for configuring processing time intervals of a fixed duration.

In one example, the first range/Doppler processor 230 produces a first set of range/Doppler images 231. For example, the first set of range/Doppler images 231 may be formed over processing time intervals of a fixed duration. In one example, the processing time intervals of fixed duration are selected to achieve a Doppler resolution $\Delta f$. For example, the Doppler resolution is inversely proportional to the processing time interval of fixed duration. Digitized signals from each receive channel are processed in the first range/Doppler processor 230 into range-Doppler images for each real receive channel or virtual receive channel, using processing time intervals of fixed duration. The processing duration may be pre-specified for each radar mode, in accordance with the required update rate for moving objects for that mode.

The radar sensor resource manager 240 informs the first range/Doppler processor 230 of the radar mode in use. In one example, the range-Doppler images are formed via two-dimensional Fourier transforms. In another example, the range-Doppler images are formed via keystone processing. In one example, keystone processing is digital signal processing used to compensate for range migration (e.g., motion of a particular radar return over more than one range resolution cell during a coherent processing time interval). In one example, the range-Doppler images include range resolution cells and Doppler resolution cells. A range resolution cell may be the smallest resolvable range interval and a Doppler resolution cell may be the smallest resolvable Doppler interval.

In one example, a speed processor 245 (e.g., a processor coupled to a memory unit) accepts the first set of range/Doppler images 231 to produce a measured radar speed 246. In one example, the measured radar speed 246 may be obtained from Doppler information in the first set of range/Doppler images 231. In one example, the speed processor 245 is configured by the radar sensor resource manager 240 which sends radar beamshape information 242 to the speed processor 245. In one example the radar beamshape information 242 includes configuration information for producing a measured radar speed 246. In one example, the speed processor 245 outputs the first set of range/Doppler images 231 and the measured radar speed 246. The speed processor 245 adaptively measures the speed of the radar system 200. In one example, the measured radar speed 246 may be derived from a maximum Doppler of short range radar returns. In one example, short range radar returns are part of the reflected waveform 215 from nearby objects. In another example, the speed of the radar system 200 may be derived from the average Doppler of short range radar returns, in conjunction with the radar beamshape information 242 provided by the radar sensor resource manager 240.

In one example, an auxiliary processor 250 (e.g., a processor coupled to a memory unit) accepts the first set of range/Doppler images 231 and the measured radar speed 246. In one example, an auxiliary device 251 provides auxiliary translation information 252 to the auxiliary processor 250. For example, the auxiliary processor 250 fuses the measured radar speed 246 with the auxiliary translation information 252, to produce a refined radar speed 253 and processing time intervals during which the radar travels a fixed distance 254. In one example, the auxiliary processor 250 produces the radar beamshape information 242 and refined radar speed 253. The first set of range/Doppler images 231 is also outputted by the auxiliary processor 250 as shown in FIG. 2. Auxiliary translation information 252 may contain auxiliary information on vehicle translation, if such information is available. For example, this information may include Global Positioning System (GPS), inertial navigation system (INS), and/or speedometer measurements.

In one example, auxiliary processor 250 combines auxiliary information, if available, with the measured radar speed 246 to produce the refined radar speed 253 and to calculate the processing time interval that provides the pre-specified (for each radar mode) radar translation to be used for subsequent processing. In one example, the refined radar speed 253 is calculated as a weighted average of all adaptive and auxiliary measurements, with weighting inversely proportional to estimated measurement uncertainties. In another example, the refined radar speed 253 is calculated as an average of the two measurements in closest agreement. In another example, the refined radar speed 253 is calculated per a pre-specified sequence (e.g., use INS speed if available; if not, use GPS speed if available; if not, use speedometer speed if available; if not, use adaptively measured speed).

In one example, a second range/Doppler processor 260 (e.g., a processor coupled to a memory unit) accepts the radar beamshape information 242, refined radar speed 253 and processing time intervals during which the radar travels a fixed distance 254. In one example, the second range/Doppler processor 260 produces a second set of range/Doppler images 261. In one example, the second set of range/Doppler images 261 is processed over processing time intervals during which the radar travels a fixed distance 254. In one example, the second set of range/Doppler images 261 may include processing not required for the time durations processed in the first range/Doppler processor 230.

Digitized signals from each receive channel are processed in second range/Doppler processor 260 into a range/Doppler image for each real receive channel or virtual receive channel, using processing time intervals during which the radar travels a fixed distance. In one example, the second set of range/Doppler images 261 is formed via two-dimensional Fourier transforms. In another example, the second set of range/Doppler images 261 is formed via keystone processing, to mitigate range walk. In another example, the second set of range/Doppler images 261 is formed via joint reciprocal-range/keystone resampling followed by two-dimensional Fourier transforms, to mitigate range walk and Doppler walk. For example, range walk is motion of a particular radar return over more than one range resolution cell during a coherent processing time interval. For example, Doppler walk is motion of a particular radar return over more than one Doppler resolution cell during a coherent processing time interval.

In one example, a first subimaging processor 270 (e.g., a processor coupled to a memory unit) accepts the first set of range/Doppler images 231, the radar beamshape information 242 and the refined radar speed 253. In one example, the first subimaging processor 270 separates the first set of range/Doppler images 231 into fixed duration endoclutter subimages 271 and fixed duration exoclutter subimages 272. In one example, a second subimaging processor 275 (e.g., a processor coupled to a memory unit) accepts the second set of range/Doppler images 261, the radar beamshape information 242, and the refined radar speed 253. In one example, the second subimaging processor 275 separates the second set of range/Doppler images 261 into fixed-distance endoclutter subimages 276 and fixed-distance exoclutter subimages 277, and discards the fixed-distance exoclutter subimages 277. In one example, an endoclutter subimage is defined as a clutter subimage that spans a first Doppler extent corresponding to angles extending from straight ahead of the radar out to the first azimuth null of the radar transmit beam. In one example, an exoclutter subimage is defined as a clutter subimage that spans a second Doppler extent corresponding to angles beyond the first azimuth null of the radar transmit beam. In one example, a clutter subimage refers to radar returns. In one example, a Doppler extent is a plurality of Doppler resolution cells. In one example, a subimage is a subset of an image (e.g., over a Doppler extent).

In one example, the second subimaging processor 275 is similar to the first subimaging processor 270, except for the discarding of the fixed-distance exoclutter subimages 277, with different processing parameters.

The fixed-duration exoclutter subimages 272 may be processed in a first detection processor 280 to mitigate against the impact of receiver noise on the radar to produce a first range/Doppler scatterer detections 281. In one example, the processing performed in the first detection processor 280 may include thresholding, Constant False Alarm Rate (CFAR) detection, or a machine learned detection algorithm. In one example, the machine learned detection algorithm may be a deep convolutional neural network. In one example, the first detection processor 280 uses a first detection algorithm.

In one example, the first detection algorithm is a constant false alarm rate (CFAR) detection algorithm. In another example, the first detection algorithm is a machine learned algorithm.

In one example, a change detection processor 285 performs either noncoherent change detection or coherent change detection (e.g., when the radar is stationary) on the fixed-duration endoclutter subimages 271 to produce a second range/Doppler scatterer detections 286.

In one example, a second detection processor 290 performs thresholding, constant false alarm rate (CFAR) detection, and/or similar detection operation to produce a third range/Doppler scatterer detections 291. In one example, the first detection processor 280 and the second detection processor 290 may include different processing parameters or use different processing algorithms. In one example, the second detection processor 290 uses a second detection algorithm.

In one example, the second detection algorithm is a CFAR detection algorithm. In another example, the second detection algorithm is a machine learned algorithm.

The fixed-duration endoclutter subimages 271 may be processed in a change detection processor 285 to mitigate against interference from stationary objects. In one example, pairs of subimages may be processed in the change detection processor 285 via noncoherent change detection. In another example, noncoherent change detection is applied to longer sequences of subimages. Noncoherent change detection may include thresholding the ratio of the standard deviation of the intensity at each pixel to the mean at that pixel, or applying a machine learned detection algorithm to the subimages. In another example, when the radar is stationary, coherent change detection may include thresholding, CFAR detection, and/or a machine learned detection algorithm applied to the complex difference of pairs of fixed-duration endoclutter subimages 271. In one example, the machine learned detection algorithms may be deep convolutional neural networks.

The fixed-distance endoclutter subimages 276 may be processed in the second detection processor 290 to mitigate against the impact of receiver noise on the radar. The processing performed in the second detection processor 290 may include thresholding, CFAR detection, and/or a machine learned detection algorithm. In one example, the machine learned detection algorithm is a deep convolutional neural network.

In one example, a first direction of arrival (DOA) processor 310 (e.g., a processor coupled to a memory unit) executes a direction of arrival algorithm on the first range/Doppler scatterer detections 281 from exoclutter range/Doppler subimages 272 formed over processing time intervals of a fixed duration. The first direction of arrival (DOA) processor 310 produces a first set of range/Doppler/angle scatterer detections 311. In one example, the direction of arrival is measured by a Fourier transform over all the receive channels. In another example, the direction of arrival is measured by a super-resolution algorithm, such as the MUltiple SIgnal Classification (MUSIC) algorithm.

In one example, a second DOA processor 320 (e.g., a processor coupled to a memory unit) executes a direction of arrival algorithm on the second range/Doppler scatterer detections 286 from endoclutter range/Doppler subimages 271 formed over processing time intervals of a fixed duration. The second DOA processor 320 produces a second set of range/Doppler/angle scatterer detections 321.

In one example, the first DOA processor 310 and the second DOA processor 320 include different processing parameters or use different processing algorithms. In one example, the direction of arrival is measured by a Fourier transform over all the receive channels. In another example, the direction of arrival is measured by a super-resolution algorithm, such as the MUSIC algorithm. In one example, the first DOA processor 310 and the second DOA processor 320 use different direction of arrival algorithms. In another example, the first DOA processor 310 and the second DOA processor 320 use a same super-resolution algorithm, but use different numbers of degrees of freedom. In another example, direction of arrival is measured in the second DOA processor 320 with Space-Time Adaptive Processing (STAP).

In one example, a third DOA processor 330 (e.g., a processor coupled to a memory unit) executes a direction of arrival algorithm on the third range/Doppler scatterer detections 291 from endoclutter range/Doppler subimages 276 formed over processing time intervals during which the radar travels a fixed distance. The third DOA processor 330 produces a third set of range/Doppler/angle scatterer detections 331. In one example, the third DOA processor 330 may include different processing parameters or use different processing algorithms than either the first DOA processor 310 or the second DOA processor 320. In one example, the direction of arrival is measured by a Fourier transform over all the receive channels. In another example, the direction of arrival is measured by a super-resolution algorithm, such as the MUSIC algorithm. In one example, the third DOA processor 330 uses a different direction of arrival algorithm than the first DOA processor 310 and/or the second DOA processor 320. In another example, the third DOA processor 330 uses the same super-resolution algorithm as the first DOA processor 310 and/or the second DOA processor 320, but uses different numbers of degrees of freedom.

In one example, a first cluster processor 340 (e.g., a processor coupled to a memory unit) clusters the first set of range/Doppler/angle scatterer detections 311 and the second set of range/Doppler/angle scatterer detections 321, from range/Doppler images formed over processing time intervals of a fixed duration, into a first set of range/Doppler/angle object detections 341. The first set of range/Doppler/angle scatterer detections 311 and the second set of range/Doppler/angle scatterer detections 321 are processed into the first set of range/Doppler/angle object detections 341 in the first cluster processor 340 by a first clustering algorithm.

In one example, the processing may include K-Means clustering. In another example, the processing may include morphological closing ("morphological closing algorithm"). For example, K-Means clustering is a technique for clustering data samples according to their distance to a plurality of mean values. For example, morphological closing is a technique for clustering data samples by removing small gaps.

In one example, a second cluster processor 350 (e.g., a processor coupled to a memory unit) clusters the third set of range/Doppler/angle scatterer detections 331, from range/Doppler images formed over processing time intervals during which the radar travels a fixed distance, into a second set of range/Doppler/angle object detections 351. In one example, the first cluster processor 340 and the second cluster processor 350 may include different processing parameters or use different algorithms. The third set of range/Doppler/angle scatterer detections 331 are processed into the second set of range/Doppler/angle object detections 351 in the second cluster processor 350 by a second clustering algorithm. In one example, the processing may include K-Means clustering. In another example, the processing may include morphological closing, using different structuring elements than those in the first cluster processor 340.

In one example, a tracking processor 360 (e.g., a processor coupled to a memory unit) tracks range/Doppler/angle object detections in time. In one example, the tracking processor 360 outputs range/Doppler/angle object tracks 361, for stationary and moving objects, to subsequent processors. In one example, the first set of range/Doppler/angle object detections 341 and the second set of range/Doppler/angle object detections 351 may be processed into range/Doppler/angle object tracks 361 by the tracking processor 360 via a multiple object tracking algorithm. In one example, the processing utilizes a Kalman filter with multiple motion models. The range/Doppler/angle object tracks 361, for stationary and moving objects, may be outputted to subsequent processors. In one example, the range/Doppler/angle object tracks 361 are fused with measurements by other sensors (e.g., video, lidar). In another example, the range/Doppler/angle object tracks 361 are passed directly to a route planning processor.

Although FIG. 2 shows separate processors for each block, in one example, a single processor (e.g. a processor coupled to a memory unit) may encompasse the functions of two or more blocks shown in FIG. 2.

In one example, the various components of FIG. 2 may be mapped to components in FIG. 1. For example, the set of image formation processors 110 in FIG. 1 may include components 211, 212, 213, 220, 230, 240, 245, 250, 251 and/or 260 of FIG. 2. For example, the set of fixed duration processors 120 in FIG. 1 may include components 270, 280, 285, 310, 320 and/or 340 of FIG. 2. For example, the set of fixed distance processors 130 in FIG. 1 may include components 275, 290, 330 and/or 350 of FIG. 2. For example, the fused tracking processor 140 of FIG. 1 may include component 360 of FIG. 2.

Although FIG. 2 shows a single processing channel for processing time intervals of fixed duration, this channel may encompass processing of multiple fixed durations. In one example, processing time intervals with a duration of 10 milliseconds are used for detecting, locating, and tracking moving objects to a range of 150 meters and processing time intervals with a duration of 20 milliseconds are used for detecting, locating, and tracking moving objects from a range of 150 meters to a range of 300 meters, etc. One skilled in the art would understand that other parameters not mentioned in the herein examples may also be within the scope and spirit of the present disclosure.

Although FIG. 2 shows a single processing channel for processing time intervals during which the radar travels a fixed distance, this channel or a plurality of channels may encompass processing of multiple fixed distances. For a radar traveling in a straight line, contours of constant Doppler are cones symmetric about the radar's trajectory. In one example, a processing time interval corresponding to a translation of one meter is used for endoclutter Doppler subimages corresponding to cone angles greater than 8 degrees and a processing time interval corresponding to a translation of two meters is used for endoclutter Doppler subimages corresponding to cone angles less than 8 degrees. Each Doppler resolution cell width depends on the distance the radar travels during the coherent processing time interval. One skilled in the art would understand that other parameters not mentioned in the herein examples may also be within the scope and spirit of the present disclosure.

Figure 3:
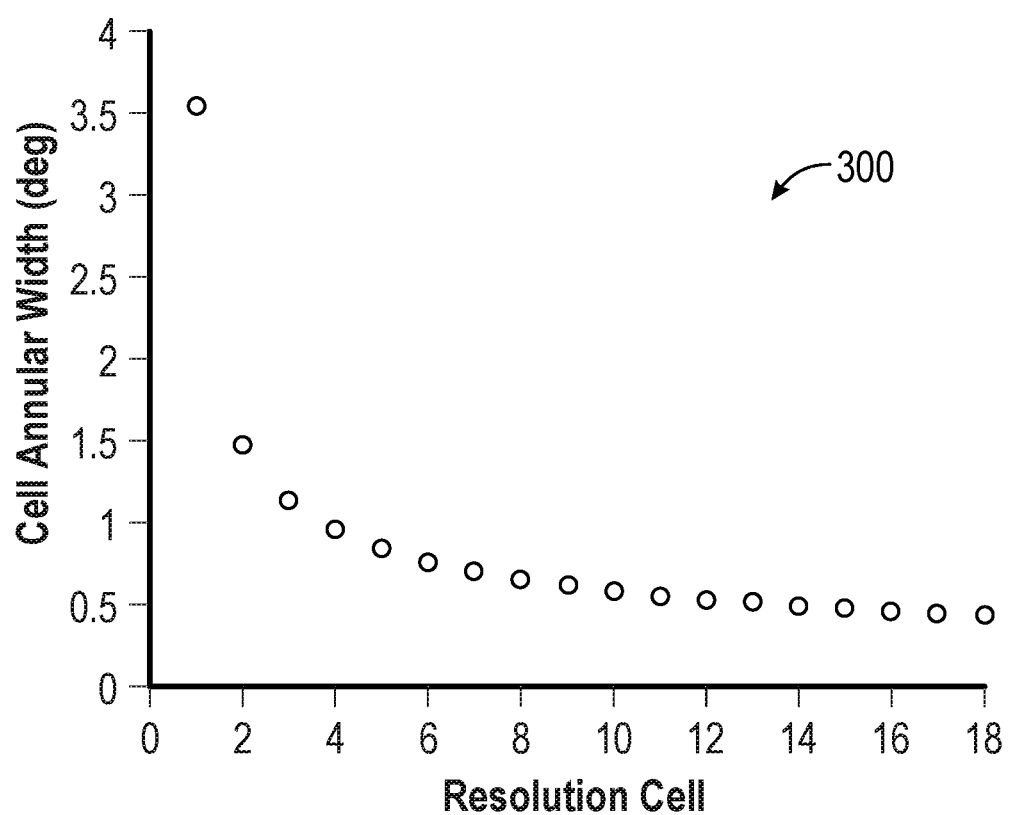
FIG. 3 illustrates a graph of an example set of angular widths for Doppler resolution cells in the forward-looking direction, at W-band for a radar translation of one meter in accordance with the present disclosure.

FIG. 3 illustrates a graph 300 of an example set of angular widths for Doppler resolution cells in the forward-looking direction, at W-band for a radar translation of one meter, in accordance with the present disclosure. In FIG. 3, the vertical axis is the Cell Annular Width (in units of degrees), and the horizontal axis is the Resolution Cell (i.e., Doppler resolution cell). For example, the Doppler resolution cell 1 corresponds to the Doppler resolution cell directly ahead of the radar. Use of a processing time interval spanning a small translation provides an update rate on the positions of stationary objects that is sufficient for safe autonomous driving, while also providing Doppler resolution that enables sufficiently accurate scatterer position measurement. In one example, a processing time interval spanning a one meter resolution cell translation may not provide a sufficient update rate for moving objects, when the vehicle is stationary or driven slowly. In one example, processing time intervals with a duration of 10 milliseconds are used for detecting, locating, and tracking moving objects.

Figure 4:
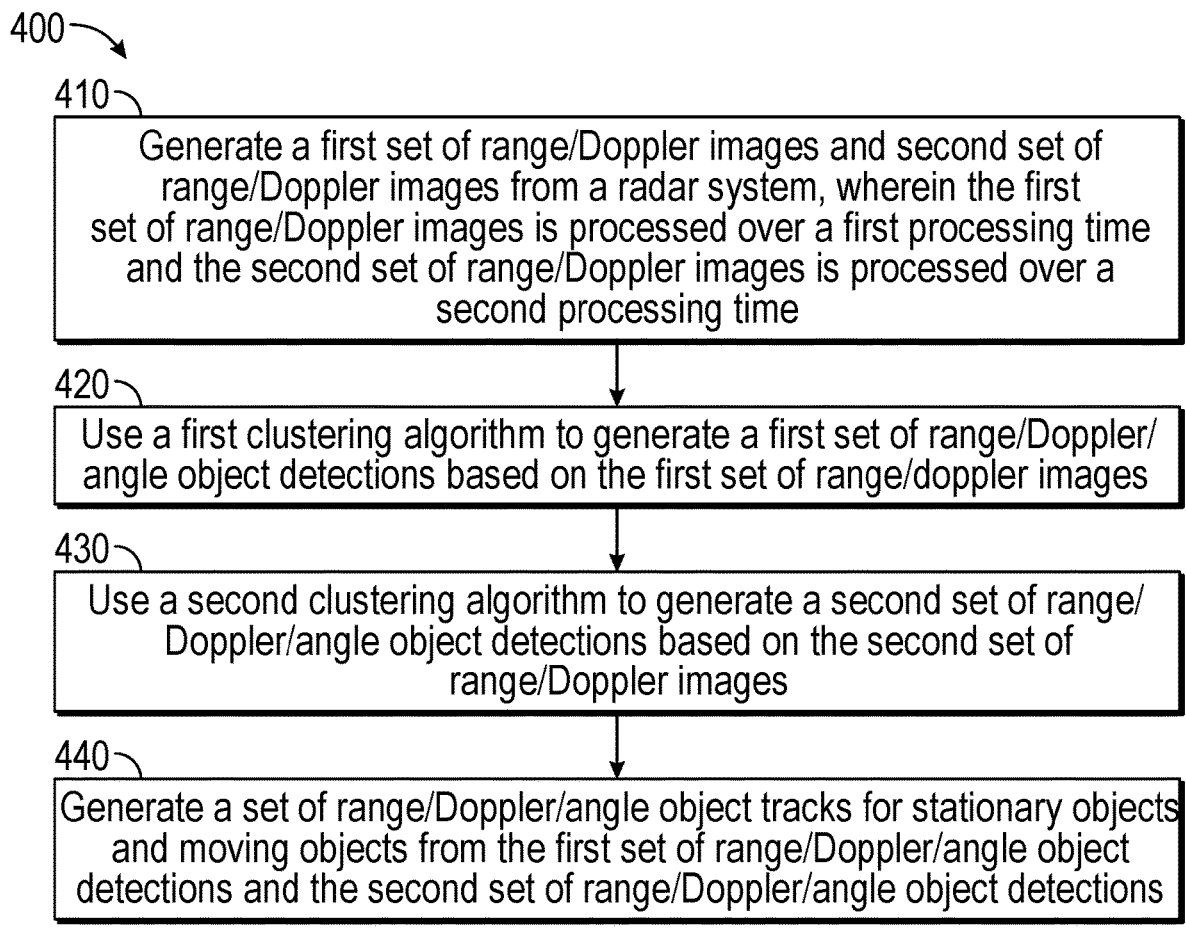
FIG. 4 illustrates an example flow diagram for a radar system with dual processing channels for stationary and moving objects in accordance with the present disclosure.

FIG. 4 illustrates an example flow diagram 400 for a radar system with dual processing channels for stationary and moving objects in accordance with the present disclosure. In block 410, generate a first set of range/Doppler images and a second set of range/Doppler images from the radar system, wherein the first set of range/Doppler images is processed over a first processing time and the second set of range/Doppler images is processed over a second processing time. In one example, the first processing time is optimized for moving objects. In one example, the second processing time is optimized for stationary objects. In one example, the first processing time is a fixed duration. In one example, the second processing time is a duration over which the radar travels a fixed distance. In one example, the range/Doppler image production is performed by the set of image formation processors 110 in FIG. 1.

In block 420, use a first clustering algorithm to generate a first set of range/Doppler/angle object detections based on the first set of range/Doppler images. In one example, the first clustering algorithm clusters a first set of range/Doppler/angle scatterer detections from the first set of range/Doppler images formed over processing time intervals of a fixed duration, into the first set of range/Doppler/angle object detections.

In one example, the first set of range/Doppler/angle scatterer detections is generated by a first direction of arrival (DOA) processor using the first set of range/Doppler scatterer detections. In one example, a first detection processor generates the first set of range/Doppler scatterer detections to mitigate against the impact of receiver noise on the radar system.

In one example, the first clustering algorithm is K-Means clustering. In another example, the first clustering algorithm is morphological closing ("morphological closing algorithm"). In one example, generating of the first set of range/Doppler/angle object detections is performed by the set of fixed duration processors 120 in FIG. 1.

In one example, the first range/Doppler subset of the first set of range/Doppler/angle positions is intensity peaks of the detections. In another example, the first range/Doppler subset of the first range/Doppler/angle positions is measured by a MUltiple SIgnal Classification (MUSIC) algorithm. In one example, the first angular subset of the first set of range/Doppler/angle positions is measured by a Fourier transform over all receive channels. In another example, the first angular subset of the range/Doppler/angle positions is measured by the MUSIC algorithm.

In block 430, use a second clustering algorithm to generate a second set of range/Doppler/angle object detections based on the second set of range/Doppler images. In one example, the second clustering algorithm clusters a second set of range/Doppler/angle scatterer detections from the second set of range/Doppler images formed over processing time intervals during which the radar system travels a fixed distance, into the second set of range/Doppler/angle object detections.

In one example, the second set of range/Doppler/angle scatterer detections is generated by a second direction of arrival (DOA) processor using the second set of range/Doppler scatterer detections. In one example, a second detection processor generates the second set of range/Doppler scatterer detections to mitigate against the impact of receiver noise on the radar system.

In one example, the second clustering algorithm is K-Means clustering. In another example, the second clustering algorithm is morphological closing ("morphological closing algorithm"). In one example, generating the second set of range/Doppler/angle object detection is performed by the set of fixed distance processors 130 in FIG. 1.

In one example, the second range/Doppler subset of the second range/Doppler/angle positions is intensity peaks of the detections. In another example, the second range/Doppler subset of the second range/Doppler/angle positions is measured by the MUSIC algorithm. In one example, the second angular subset of the range/Doppler/angle positions is measured by a Fourier transform over all receive channels. In another example, the second angular subset of range/Doppler/angle positions is measured by the MUSIC algorithm.

In block 440, generate a set of range/Doppler/angle object tracks for stationary and moving objects from the first set of range/Doppler/angle object detections and the second set of range/Doppler/angle object detections. In one example, generating the range/Doppler/angle object tracks is performed by the fused tracking processor 140.

In one aspect, one or more of the steps for providing dual processing in FIG. 4 may be executed by one or more processors which may include hardware, software, firmware, etc. In one aspect, one or more of the steps in FIG. 4 may be executed by one or more processors which may include hardware, software, firmware, etc. The one or more processors, for example, may be used to execute software or firmware needed to perform the steps in the flow diagram of FIG. 4. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for dual processing. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for implementing dual processing for stationary objects and moving objects, the method comprising:
converting a received reflected waveform from receive antenna elements into a digitized receive data flow;
generating a first set of range/Doppler images and a second set of range/Doppler images from the digitized receive data flow from a radar system, wherein the first set of range/Doppler images is processed over a first processing time and the second set of range/Doppler images is processed over a second processing time;
using a first clustering algorithm to generate a first set of range/Doppler/angle object detections based on the first set of range/Doppler images;
using a second clustering algorithm to generate a second set of range/Doppler/angle object detections based on the second set of range/Doppler images; and
generating a set of range/Doppler/angle object tracks for stationary and moving objects from the first set of range/Doppler/angle object detections and the second set of range/Doppler/angle object detections.

2. The method of claim 1, wherein the first processing time is optimized for the moving objects.

3. The method of claim 2, wherein the second processing time is optimized for the stationary objects.

4. The method of claim 1, wherein the first processing time is a fixed duration.

5. The method of claim 4, wherein the second processing time is a duration over which the radar system travels a fixed distance.

6. The method of claim 1, wherein the first clustering algorithm is a K-Means clustering algorithm or a morphological closing algorithm.

7. The method of claim 6, wherein the second clustering algorithm is a K-Means clustering algorithm or a morphological closing algorithm.

8. The method of claim 1, wherein the first clustering algorithm clusters a first set of range/Doppler/angle scatterer detections from the first set of range/Doppler images formed over processing time intervals of a fixed duration, into the first set of range/Doppler/angle object detections.

9. The method of claim 8, wherein the second clustering algorithm clusters a second set of range/Doppler/angle scatterer detections from the second set of range/Doppler images formed over processing time intervals during which the radar system travels a fixed distance, into the second set of range/Doppler/angle object detections.

10. The method of claim 9, further comprising generating a first set of range/Doppler scatterer detections to mitigate against the impact of receiver noise on the radar system.

11. The method of claim 10 further comprising generating the first set of range/Doppler/angle scatterer detections using the first set of range/Doppler scatterer detections.

12. The method of claim 10, further comprising generating a second set of range/Doppler scatterer detections to mitigate against the impact of receiver noise on the radar system.

13. The method of claim 12 further comprising generating the second set of range/Doppler/angle scatterer detections using the second set of range/Doppler scatterer detections.

14. An apparatus for dual processing, the apparatus comprising:
a radar transceiver to convert a received reflected waveform from receive antenna elements into a digitized receive data flow;
a set of image formation processors to generate a first set of range/Doppler images and a second set of range/Doppler images from the digitized receive data flow from a radar system, wherein the first set of range/Doppler images is processed over a first processing time and the second set of range/Doppler images is processed over a second processing time;
a first clustering algorithm device to generate a first set of range/Doppler/angle object detections based on the first set of range/Doppler images, wherein the first clustering algorithm device is coupled to the set of image formation processors;
a second clustering algorithm device to generate a second set of range/Doppler/angle object detections based on the second set of range/Doppler images, wherein the second clustering algorithm device is coupled to the set of image formation processors; and
a fused tracking processor, coupled to the first clustering algorithm device and the second clustering algorithm device, to generate a set of range/Doppler/angle object tracks for stationary and moving objects from the first set of range/Doppler/angle object detections and the second set of range/Doppler/angle object detections.

15. The apparatus of claim 14, wherein the first clustering algorithm device clusters a first set of range/Doppler/angle scatterer detections from the first set of range/Doppler images formed over processing time intervals of a fixed duration, into the first set of range/Doppler/angle object detections.

16. The apparatus of claim 15, wherein the second clustering algorithm device clusters a second set of range/Doppler/angle scatterer detections from the second set of range/Doppler images formed over processing time intervals during which the radar system travels a fixed distance, into the second set of range/Doppler/angle object detections.

17. The apparatus of claim 16, further comprising a first detection processor to generate a first set of range/Doppler scatterer detections to mitigate against the impact of receiver noise on the radar system, and a second detection processor to generate a second set of range/Doppler scatterer detections to mitigate against the impact of receiver noise on the radar system.

18. The apparatus of claim 17 further comprising a first direction of arrival (DOA) processor to generate the first set of range/Doppler/angle scatterer detections using the first set of range/Doppler scatterer detections and a second direction of arrival (DOA) processor to generate the second set of range/Doppler/angle scatterer detections using the second set of range/Doppler scatterer detections.

* * * * *